4 Sheets—Sheet 1.

C. W. FROST.

CALENDAR.

No. 10,648. Reissued Sept. 29, 1885.

WITNESSES

R. E. Grant

M. B. Shanks.

Chas. W. Frost

INVENTOR by Connally Bros.

Attorneys

4 Sheets—Sheet 2.

C. W. FROST.

CALENDAR.

No. 10,648. Reissued Sept. 29, 1885.

Chas. W. Frost
INVENTOR

WITNESSES

R. E. Grant
M. B. Harris

Connolly Bros.
Attorneys

4 Sheets—Sheet 3.

C. W. FROST.

CALENDAR.

No. 10,648. Reissued Sept. 29, 1885.

WITNESSES

R. E. Grant

M. B. Rains

Chas. W. Frost

INVENTOR by Connally Bros.

Attorneys

C. W. FROST.

CALENDAR.

No. 10,648. Reissued Sept. 29, 1885.

Chas. W. Frost
INVENTOR

WITNESSES
R. E. Grant
G. B. Harris by Connolly Bros.
Attorneys

UNITED STATES PATENT OFFICE.

CHARLES W. FROST, OF PHILADELPHIA, PENNSYLVANIA.

CALENDAR.

SPECIFICATION forming part of Reissued Letters Patent No. 10,648, dated September 29, 1885.
Original No. 301,490, dated July 8, 1884. Application for reissue filed September 3, 1884.

*To all whom it may concern:*

Be it known that I, CHARLES W. FROST, of Philadelphia, in the county of Philadelphia and State of Pennsylvania, have invented certain new and useful Improvements in Calendars; and I do hereby declare the following to be a full, clear, and exact description of the invention, which will enable others skilled in the art to which it appertains to make and use the same, reference being had to the accompanying drawings, which form a part of this specification.

Figure 1:
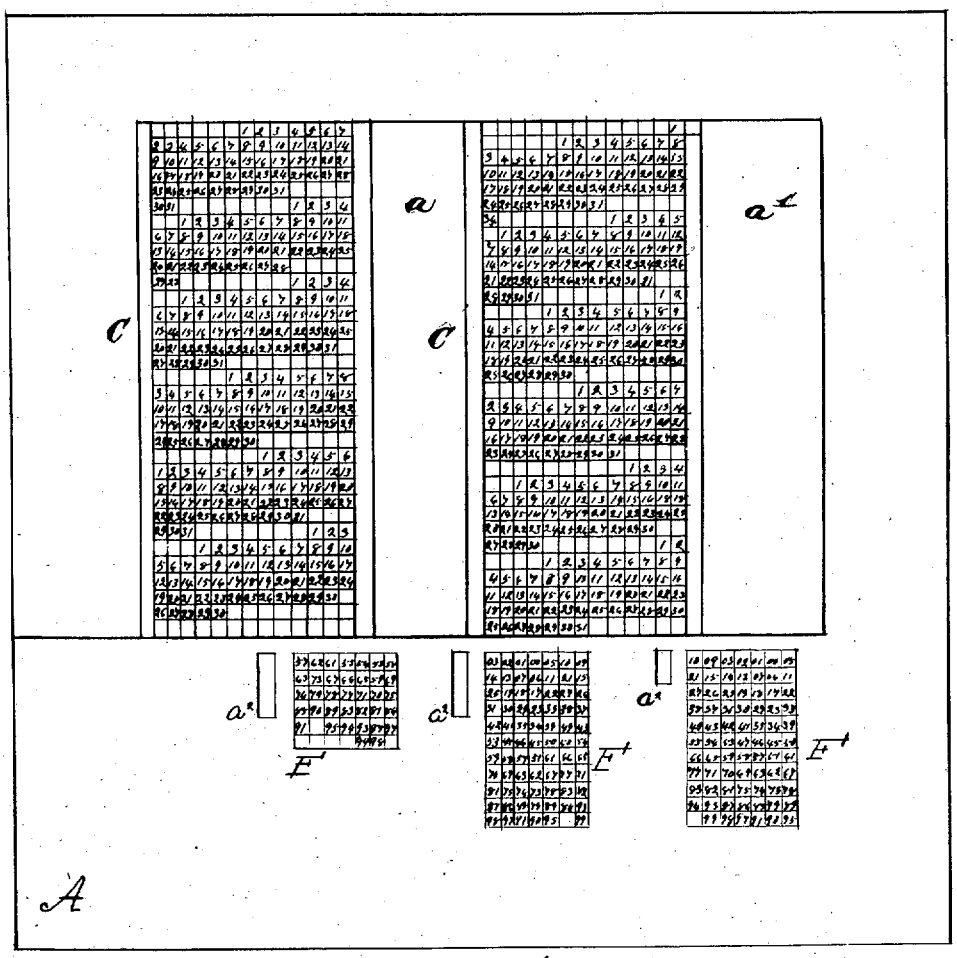
Figure 2:
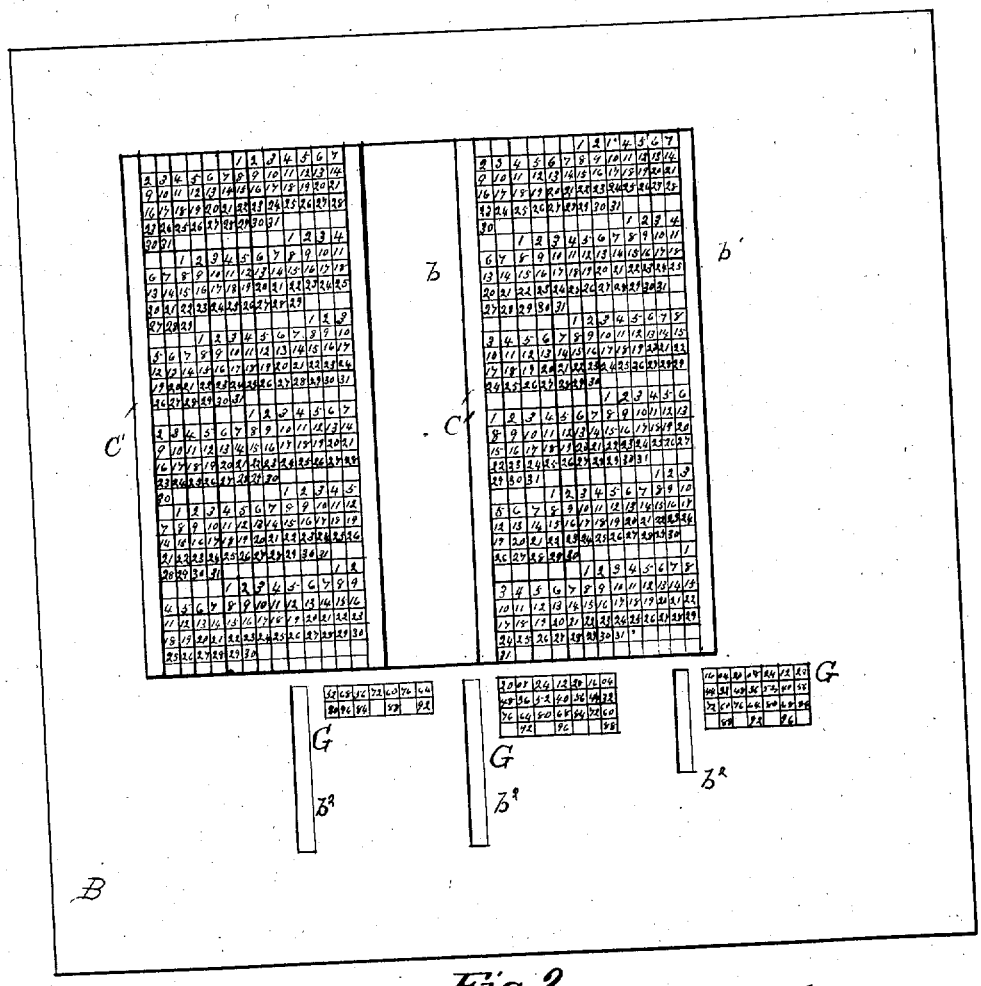
Figure 3:
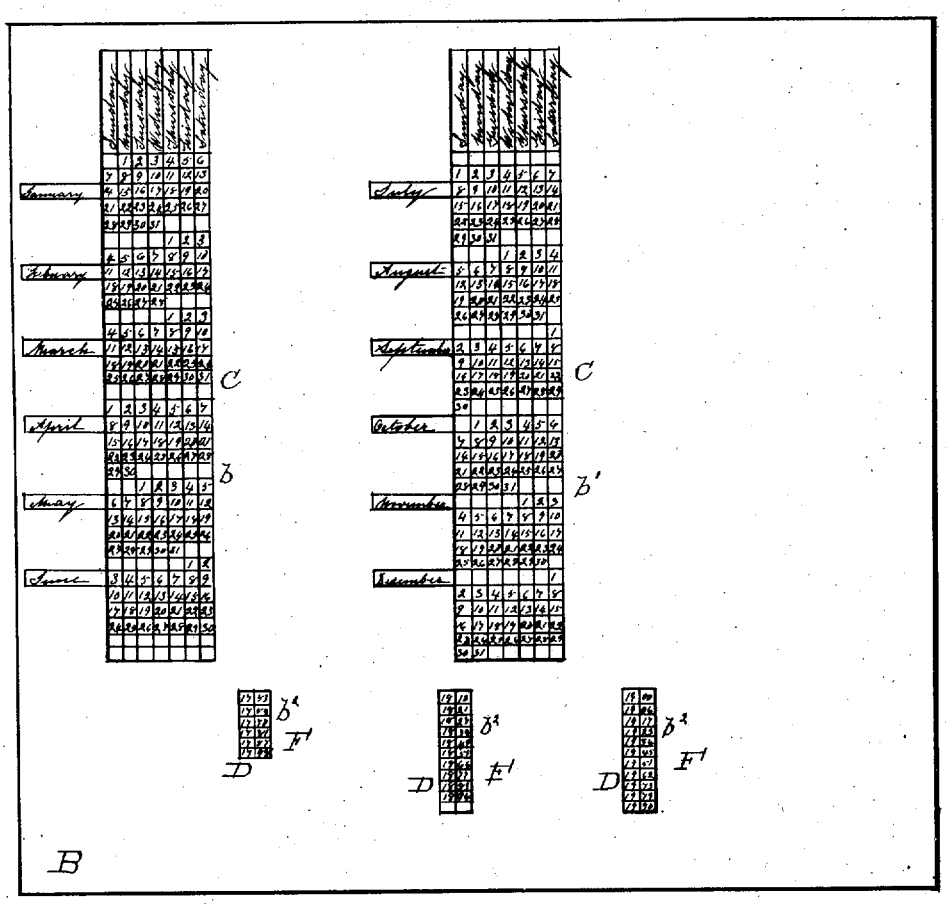
Figure 4:
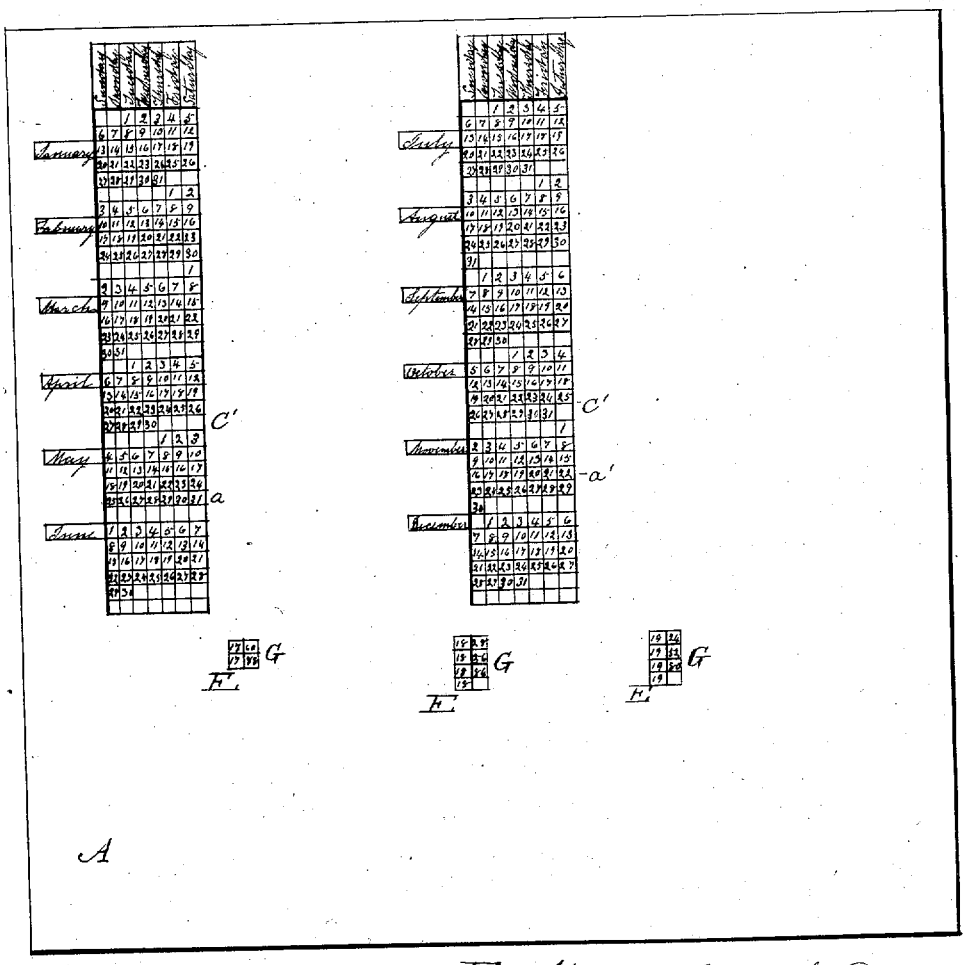

Figure 1 is a plan or diagram of one side of one sheet of calendar, and Fig. 2 a similar view of corresponding side of other sheet of calendar. Fig. 3 is a front view of calendar set for common year, and Fig. 4 is a reverse side of calendar set for leap-year.

My invention has for its object to provide a "perpetual" annual calendar which shall exhibit leap-years as well as common years, and which shall show in one view the number of the year for which it is set, and every day in said year.

My invention consists of a calendar composed of two cards or sheets, each of which has tables of figures printed on both sides, and is formed with slots which permit the figures on one side of each card to be viewed through the other card, as hereinafter more fully set forth.

Referring to the accompanying drawings, A and B represent, respectively, two similar cards or sheets, which have vertical slots or openings $a$ $a'$ and $b$ $b'$. Each card or sheet has also one or more vertical slots, $a^2$ $b^2$. On one side of each card the days of the week (or the initial letters thereof) are printed in series above the slots $a$ $a'$ $b$ $b'$, and on the same side of each card or sheet the names of the months are printed alongside of said slots, as shown. Adjacent to the small slots $a^2$ $b^2$, and on the same side of the cards or sheets as the name of the days and months, the numerals of the centuries embraced by the calendar are printed, the card B having the numerals for the common years and the card A the numerals for leap-years, as shown at D and E, respectively. On the opposite sides of the cards are printed tables of figures C C', representing the days of the months. These tables are in vertical columns to the number of thirteen, of such width that only seven columns of each table will be exhibited at one time through the slots $a$ $a'$ $b$ $b'$ when the cards are laid one over another. By a lateral movement of the cards all of the thirteen columns, seven at a time, will be exhibited. On the same side of the cards as have the figures for the days of the month are printed numerals indicating the units and tens of centuries, (shown at F and G.) The columns F on card A are for common years, and the columns G on card B are for the leap-years. Instead of this arrangement the entire number of years may be printed on one card and appear through the slot on the other—that is, instead of 18 showing on one card and 83 on the other through the slot, the entire numeral 1883 may show through the slot. These columns are in such position on their respective cards that they will show through the slots $a^2$ $b^2$ at the same time that the tables C C' show through the slots $a$ $a'$ $b$ $b'$, so that the face of the calendar will show the numerals for the year—"1883," for example, for the present year—and the numeral and name for every day in each month of the year at the same time.

The columns C C and F G are so arranged that when one of the cards is slid on the other, to change the calendar from one year to another, the numerals for the days of the month will be changed at the same time.

The operation is as follows: Move the cards laterally, or one upon the other, until the year for which the calendar is to be set is shown by conjunction of the columns D and F or E and G—for example until "83" appears through slot $a^2$ adjacent to "18." The same movement that produces this exhibition also brings the columns C C' into such position with respect to the openings $a$ $a'$ that the figures for the days of all the months are brought into lines with the names or initials of the days of the week.

Instead of having two slots $a$ $a'$, a single slot of double the length might be employed, and in this case the columns C on each card might be in a single column of the same length as the single elongated slot. The proportions of the cards would not, however, be as desirable as where two columns and two slots are made.

When the cards have been adjusted, (or the calendar set for any particular year,) they may be held by any suitable clamp, frame, or fastening device.

What I claim as my invention is as follows:

A changeable annual calendar composed of two cards or sheets, each of which is provided with the names or initials of the days of the week and the names of the months on one side, and with tables of the days of the months of the whole year and of the year-numerals on the other side, said cards having also slots or openings through which the tables on one card will show in connection with the names and columns on the corresponding side of the other card, whereby the entire calendar for the year is shown at one time with the century-numerals for that year, one side of said calendar showing common years and the other side leap-years, such calendar being changeable, substantially as set forth.

In testimony that I claim the foregoing I have hereunto set my hand, this 22d day of August, A. D. 1884, in presence of two witnesses.

CHAS. W. FROST.

Witnesses:
WM. H. MYERS,
BERTLES SHEE.